(12) United States Patent
Robinson

(10) Patent No.: US 8,340,895 B2
(45) Date of Patent: Dec. 25, 2012

(54) METHOD OF PERFORMING MIXED CATEGORY AND POINT OF INTEREST SEARCH AND RELATED PERSONAL NAVIGATION DEVICE

(75) Inventor: Colin Stephen Forbes Robinson, North Shore (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 589 days.

(21) Appl. No.: 12/613,526

(22) Filed: Nov. 5, 2009

(65) Prior Publication Data
US 2011/0106441 A1    May 5, 2011

(51) Int. Cl.
*G01C 21/00* (2006.01)
(52) U.S. Cl. .................... 701/400; 701/537; 701/468
(58) Field of Classification Search .................... None
See application file for complete search history.

(56) References Cited

U.S. PATENT DOCUMENTS

| | | | |
|---|---|---|---|
| 7,349,896 B2* | 3/2008 | Chowdhury et al. | 1/1 |
| 7,523,099 B1* | 4/2009 | Egnor et al. | 1/1 |
| 2007/0011146 A1* | 1/2007 | Holbrook | 707/3 |
| 2008/0172357 A1* | 7/2008 | Rechis et al. | 707/2 |
| 2008/0172362 A1* | 7/2008 | Shacham et al. | 707/3 |
| 2009/0171576 A1* | 7/2009 | Kim et al. | 701/209 |
| 2011/0060752 A1* | 3/2011 | Lane et al. | 707/766 |

* cited by examiner

*Primary Examiner* — Michael J. Zanelli
(74) *Attorney, Agent, or Firm* — Winston Hsu; Scott Margo

(57) ABSTRACT

To provide a simple interface that can operate seamlessly across a mix of databases with different categorization, individually or concurrently, and limit categories offered to those categories directly relevant to a search term entered, a method of querying and displaying point of interest category and point of interest item information in a personal navigation device includes sending a search term to a first server, receiving matching category data from the first server, displaying a representation of the matching category, sending a query to a second server when the matching category is selected, receiving point of interest data corresponding to the matching category from the second server, and displaying a point of interest described in the point of interest data.

14 Claims, 4 Drawing Sheets

POI Locator

Search : [Chinese] [Go]

220

Search Results:

1) Chinese Wok @ 11$^{st}$ Ave

2) Han's Chinese @ 24 Lake St

METHOD OF PERFORMING MIXED CATEGORY AND POINT OF INTEREST SEARCH AND RELATED PERSONAL NAVIGATION DEVICE

BACKGROUND OF THE INVENTION

1. Field of the Invention

The present invention relates to methods for querying point of interest (POI) information in personal navigation devices (PNDs), and more particularly, to a method utilized for querying and displaying POI category and POI item information in a PND.

2. Description of the Prior Art

Personal navigation devices (PNDs) utilize navigation satellite signals, such as Global Positioning System (GPS) satellite signals, to determine their immediate location at any point on the Earth with satellite coverage. When location information is further combined with street maps, navigation is possible, such that, even if a user were to deviate from their planned route, the personal navigation device may use the immediate location to find the user's current location on the street map, and rechart a course to navigate safely to the user's intended destination.

As the PNDs become more developed, many additional features are included, such as color displays, voice prompts, and point of interest (POI) locators. These advances are brought about by improvements in liquid crystal display (LCD) technology, touch screen technology, storage media, processing speed and efficiency, as well as database development and population. Another important addition to the PND is a network interface module, whether that be in the form of a Bluetooth transceiver connected to a GPRS modem, an integrated 802.11-type transceiver, a 3G transceiver, or a WiMax transceiver. The PND having the network interface module may be called a "connected PND", and is able to access online databases containing information about POIs that can be cross-referenced to the user's immediate position, or a position along the user's current route to their intended destination.

Please refer to FIG. 1, which is a diagram illustrating a POI database query method according to the prior art, and FIG. 2, which is a diagram illustrating a search interface displaying search results from FIG. 1 based on a query. As shown in FIG. 1, a PND 110 accesses a POI repository 130 through an intermediary server 120. The POI repository 130 has a categorized list of a large number of POIs, and the intermediary server 120 has a list of all categories of POIs contained in the POI repository 130. Two methods may be employed for accessing the POI repository 130. In the first method, which may be termed "search by item," the PND 110 sends the query to the intermediary server 120. The intermediary server 120 may have a list of a plurality of root categories, such as "Restaurants" and "Museums," and respective subcategories of the root categories, such as "Fast Food," "Italian," and "Chinese" subcategories for the Restaurants root category, and "Art" and "History" subcategories for the Museums root category. The intermediary server 120 submits the query directly to the POI repository 130, which returns POI information as search results back to the PND 110 through the intermediary server 120. In the second method, which may be termed "browse by category," the PND 110 browses the plurality of root categories and respective subcategories on the intermediary server 120, and, upon reaching a lowest level subcategory, e.g. the Chinese subcategory under the Restaurants root category, the intermediary server 120 retrieves a list of POIs cross-referenced by location of all POIs in the Chinese subcategory from the POI repository 130.

As shown in FIG. 2, when the user enters a query for "Chinese" in a POI Locator interface 220 run on the PND 110, the intermediary server 120 passes the query on to the POI repository 130, and the POI repository 130 responds with a list of POIs containing the word "Chinese" located near the current position of the PND 110. As shown, the search results include "Chinese Wok" and "Han's Chinese".

Although the method of the prior art is capable of delivering POI information to the user of the PND through searching or browsing, the prior art method can lead to some problems. First, the user may be uncertain as to what string to use to find the items they are looking for. Second, the user cannot see the whole category/subcategory tree, and therefore does not necessarily know which root category to start with, or whether there is a category for the item they are looking for. The user has to make a choice between the two modes and may be uncertain as to whether browsing will be more fruitful than searching. Also, it is often the case that an item can be found in multiple categories, but this is unclear when making the decision to browse. Another problem is that the search may span multiple databases, some of which may only support text search or support incompatible categories. And finally, where the device providing the search UI has only a small screen, the user is not able to see all categories at once.

SUMMARY OF THE INVENTION

According to one embodiment, a method of querying and displaying point of interest information in a personal navigation device starts with the personal navigation device sending a search term to a first server for finding a matching category corresponding to the search term. The search term is inputted to the personal navigation device through a user interface of the personal navigation device. The personal navigation device receives matching category data corresponding to the search term from the first server. The personal navigation device displays a representation of the matching category described in the matching category data. The personal navigation device sends a query to a second server when the matching category is selected through the user interface of the personal navigation device. The personal navigation device receives point of interest data corresponding to the matching category from the second server. The personal navigation device displays a point of interest described in the point of interest data.

According to another embodiment, a method of querying and displaying point of interest information in a personal navigation device starts with the personal navigation device sending a search term to a first server for finding a matching category corresponding to the search term. The search term is inputted to the personal navigation device through a user interface of the personal navigation device. The personal navigation device sends the search term to a second server when no matching category is found when querying the plurality of categories on the first server. The personal navigation device receives matching point of interest data from the second server, and displays a matching point of interest described in the matching point of interest data.

According to another embodiment, a personal navigation device comprises a display, an input interface for receiving user input including a search term, a networking device for establishing a first network connection with a first server and a second network connection with a second server, and processing circuits. The processing circuits control the networking device to send the search term to the first server, parse matching category data corresponding to the search term received through the networking device from the first server, control the display to display a representation of the matching category, control the networking device to send a query to a second server when the matching category is selected through the input interface, and control the display to display a point of interest described in point of interest data corresponding to the matching category received from the second server through the networking device. A data bus is electrically connected to the display, the input interface, the networking device, and the processing circuits.

According to another embodiment, a personal navigation device comprises a display, an input interface for receiving user input including a search term, a networking device for establishing a first network connection with a first server and a second network connection with a second server, and processing circuits. The processing circuits control the networking device to send the search term to the first server, control the networking device to send the search term to a second server when no matching category is received from the first server, and control the display to display a matching point of interest described in matching point of interest data corresponding to the search term received from the second server through the networking device. A data bus is electrically connected to the display, the input interface, the networking device, and the processing circuits.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating a search interface displaying search results from FIG. 1 based on a query.

DETAILED DESCRIPTION

Figure 1:
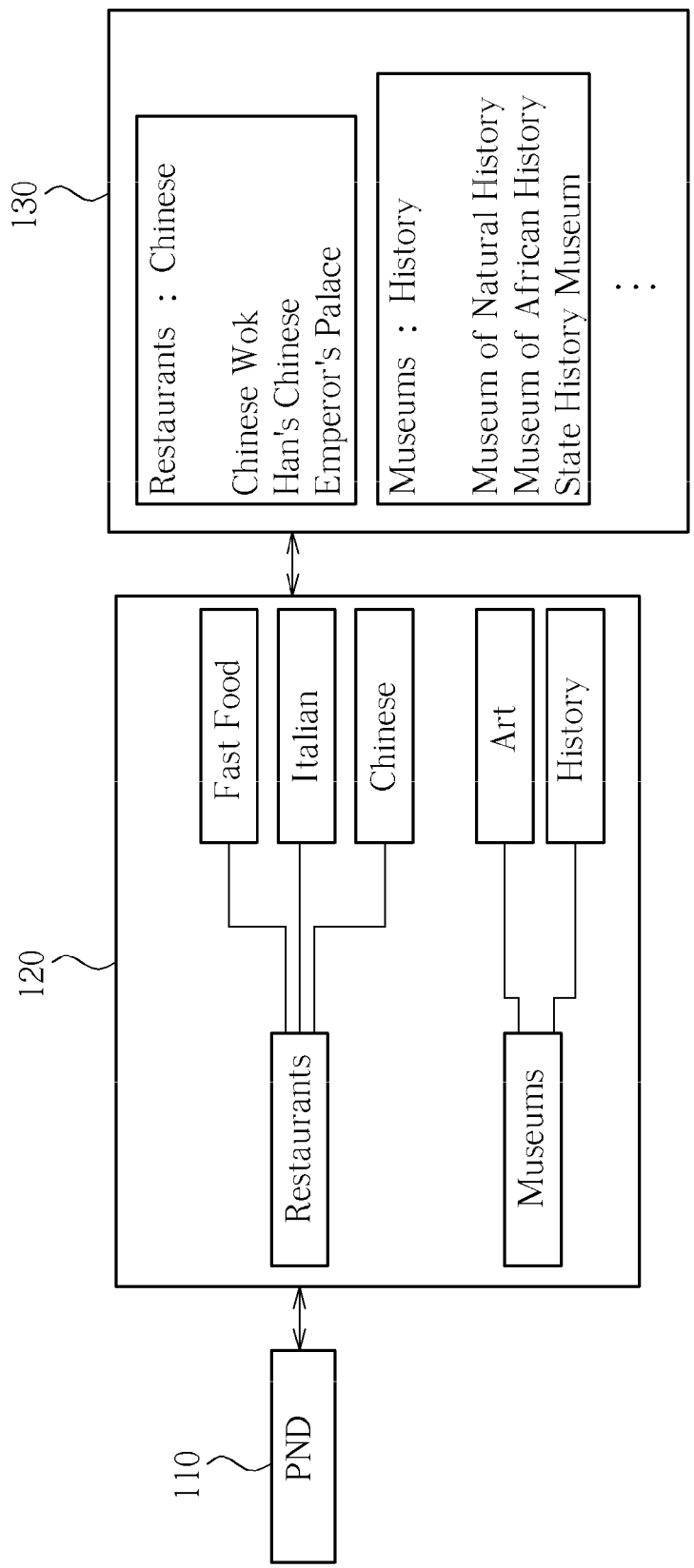
FIG. 1 is a diagram illustrating a POI database query method according to the prior art.
Figure 3:
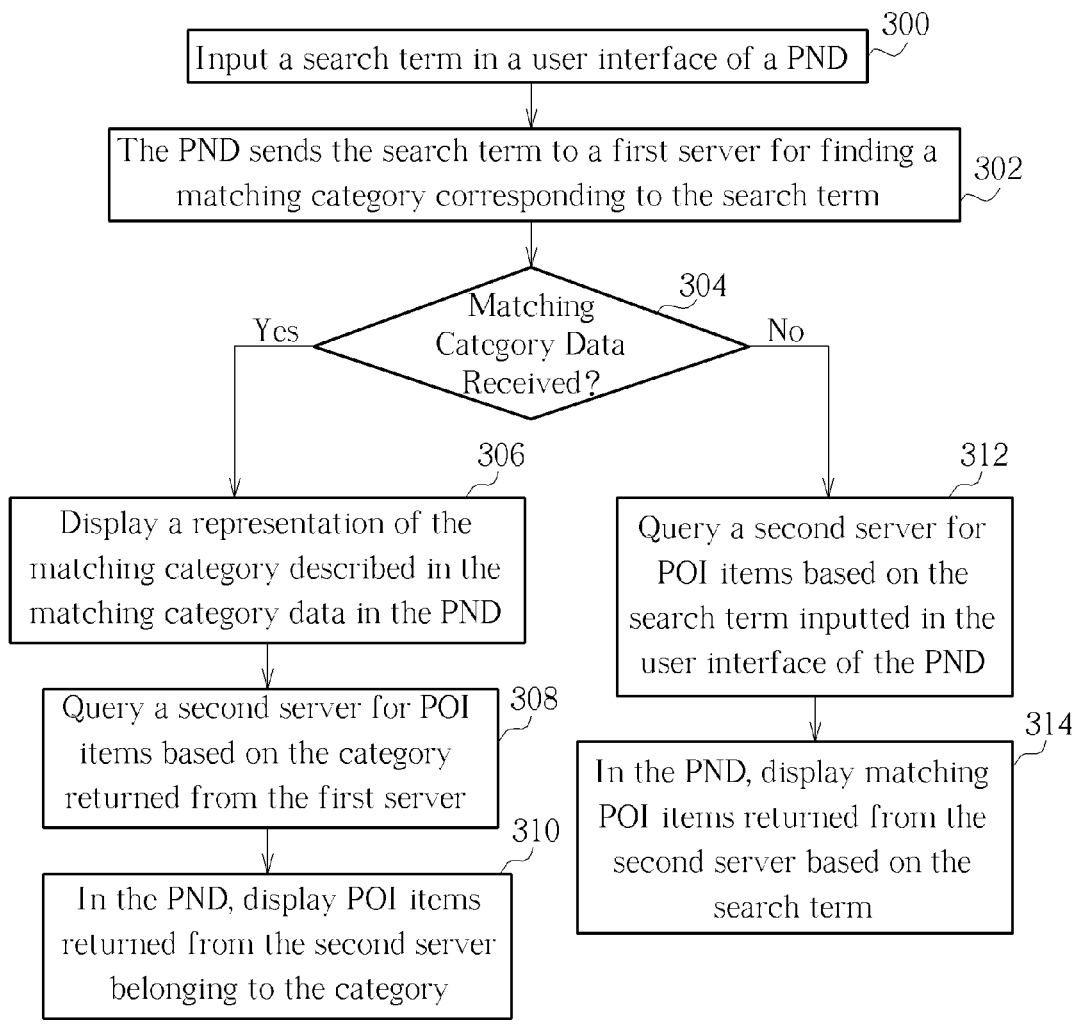
FIG. 3 is a flowchart of a method of querying and displaying POI category and POI item information according to the present invention.

Please refer to FIG. 3, which is a flowchart of a method of querying and displaying POI category and POI item information according to an embodiment of the present invention. A POI item may be a data structure including data fields, such as name, longitude, latitude, address, phone number, email, and rating. Each POI item may be listed in one or more POI categories. The method may be utilized with the PND 110, a first server, such as the intermediary server 120, and a second server, such as the POI repository 130 shown in FIG. 1. The method may include the following steps:

Step 300: Input a search term in a user interface of a PND.

Step 302: The PND sends the search term to a first server for finding a matching category corresponding to the search term.

Step 304: If the PND receives matching category data corresponding to the search term from the first server, go to Step 306. Else go to Step 312.

Step 306: Display a representation of the matching category described in the matching category data in the PND.

Step 308: Query a second server for POI items based on the category returned from the first server.

Step 310: In the PND, display POI items returned from the second server belonging to the category.

Step 312: Query a second server for POI items based on the search term inputted in the user interface of the PND.

Step 314: In the PND, display matching POI items returned from the second server based on the search term.

In Step 300, the user may enter a search term, such as a string, in a user interface of the PND. The search term may be a plurality of ASCII characters. For example, the user may enter the string "Chinese" mentioned above. The string may comprise Boolean operators, such as "AND," "OR," "NOT", or other operators. Thus, the user may enter a string "Chinese OR Italian" to search for either "Chinese" or "Italian". Each non-operator word in the string may be a search keyword. The string may be subdivided into search keywords and search operators by utilizing the "space" character, commas, semicolons, or other non-alphanumeric characters. Quotation marks may be utilized to indicate that search is to be performed on an entire phrase, such as "Chinese Wok", without separating the phrase into search keywords, but instead keeping the phrase as one single search keyword.

In Step 302, based on the search term inputted in Step 300, the PND sends the search term to a first server for finding a category corresponding to the search term. The search term may be packetized by the PND into a plurality of packets, and transmitted to the first server over a network connection. The first server may receive the plurality of packets from the PND, extract the search term from the packets, and find a matching category on the first server matching the search term. One or more categories of a plurality of categories stored on the first server may be found based on the search term inputted in Step 300. If a matching category is found, category identifiers corresponding to the matching category may be returned to the PND based on the query performed in Step 302. A plurality of matching categories may be found according to the search term. Matching category data including the matching categories found according to the search term may be received by the PND from the first server. The matching category data may include category data structures. The matching category data may also include specific values of fields of the category data structures. Representation of the matching category may be displayed in the PND (Step 306). The representation may include a unique identifier, category name, and/or category path. A category path may include a reference to a root category, and references to any intervening parent categories between the category returned to the PND and the root category. The method may be concluded at Step 306.

In Step 302, the PND may download a list of the plurality of categories from the first server, store the list in memory of the PND, and perform a local search on the list stored in the memory. The search may be performed at the first server. The search may also be performed by an unrelated application (relative to the PND and the first server), and the search results may be sent from the first server or the unrelated application to the PND. In either case, when the matching category is found based on the search term, the PND may display the representation of the matching category (Step 306). The matching category returned to the PND may also be an ancestor category of one category of the plurality of categories which is found based on the string. For example, if a category "Chinese" is found based on a search term "Chinese," the at least one category returned to the PND may be "Restaurants", which may be an ancestor category of the category "Chinese".

The representation of the matching category may include text, an icon, or another suitable form of representation for the matching category. For example, a path of the matching category may be displayed. The path may be a full path, e.g. "Museums:History:World History:European History:French History", or an abbreviated path, e.g. "Museums . . . European History:French." The full path may show names of the matching category and all ancestor categories of the matching category; the abbreviated path may show name of the matching category and name of a root category of the matching category. The abbreviated path may also be an abbreviation of the full path. For example, the abbreviated path may show a first number of leading characters of the full path, a predetermined number of period characters, and a second number of trailing characters of the full path. The representation may also be a name of the matching category, e.g. "French". Thus, a path for the matching category may be a path string comprising at least a name of the matching category and a name of one ancestor category of the matching category. In the example just described, the category "French" and the ancestor categories "Museums" and "European History" of the category "French" are displayed in the abbreviated path. The representation may be a full tree or an abbreviated tree display of the matching category. For example, "Museums" may be displayed on a first line, "History" may be displayed on a second line with an indentation, and so on down to "French." The representation may also include information about the matching category, such as a number of child categories of the matching category, a number of descendent categories of the matching category, or a number of POI items belonging to the matching category and all of its descendent categories. The number may be displayed enclosed by parentheses following the name of the category, e.g. "French (5)" may indicate that five POI items may be descendents of the category "French". The matching category may have descendent categories. The representation may show the descendent categories of the matching category, such that a descendent relationship of the matching category may be displayed in the PND, e.g. "French:Revolutionary" may indicate that the category "French" has a descendent category of "Revolutionary". The representation of the matching category may also include information about the second server, which may have POI items of the matching category. The second server may be any POI repository, such as Infobel™ or Google™. And, more than one second server may be accessible by the PND or the first server. Further, the first server and second server may be the same server. The first server may perform all functions of the second server. The second server may perform all functions of the first server.

If the category search performed in Step 302 does not produce any search results, the method may proceed to Step 312 to query the second server for POI items based on the search term inputted in the user interface of the PND. The user may enter a search term that does not match any of the plurality of categories, but the search term may match POI items in the second server, and receive database search results that may be displayed in the PND in Step 314. Step 308 may be performed if the category search returns results (Step 304), and the POI item search results can be displayed (Step 310) along with the category search results (Step 306) in the PND. Step 310 may also be performed when the user selects the matching category through a button press, touch screen press, click, or other method of selection. This increases efficiency of use of the second server, because the search for POI items on the second server may be limited to POI items within the matching category selected by the user. Of course, this also may reduce search time and resources spent on accessing multiple second servers when the category selected by the user excludes one or more of the second servers.

Once the POI item is found based on the search term, and the PND receives information about the POI item either directly from the second server, from the first server, or through an unrelated POI item transmission application, the PND may display a representation of the POI item. The representation of the POI item may include a path, e.g. a full path or an abbreviated path, of the POI item, as well as other types of information about the POI item, such as which POI repository the POI item was found in, an address of the POI item, a phone number of the POI item, ratings of the POI item, or other information relevant to the POI item.

Figure 4:
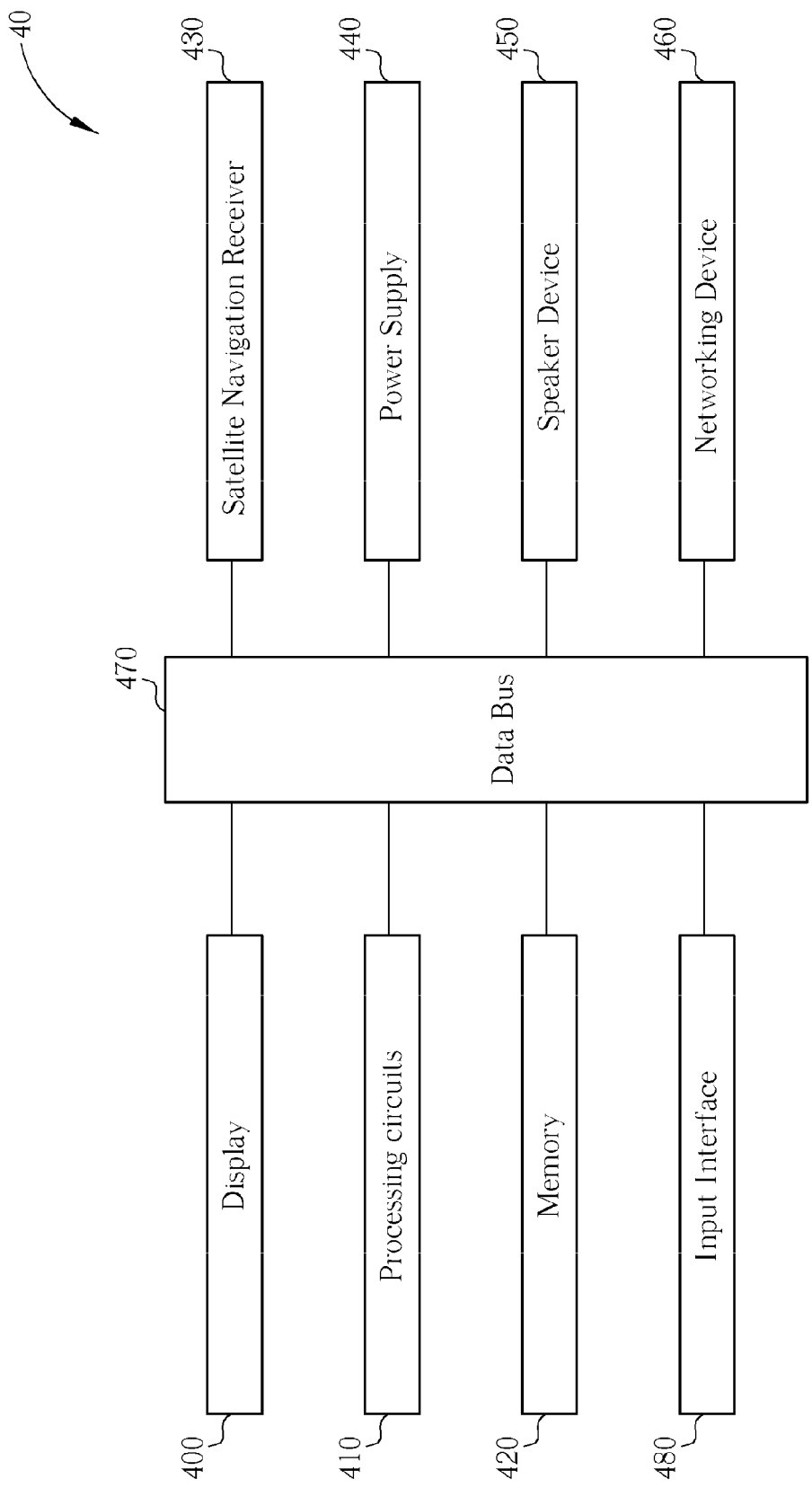
FIG. 4 is a diagram of a personal navigation device according to an embodiment of the present invention.

Please refer to FIG. 4, which is a diagram of a personal navigation device 40 according to an embodiment of the present invention. The personal navigation device 40 may be a handheld device, and may comprise components such as a display 400, processing circuits 410, memory 420, a satellite navigation receiver 430, a power supply 440, a speaker device 450, and a networking device 460. The personal navigation device 40 may be configured to be powered through a battery unit, or through an external power source, such as a car adapter. The personal navigation device 40 may comprise an input interface 480, such as a keypad, for receiving user input. The input interface 480 may be a touch-sensitive layer applied to the display 400, e.g. in a touch screen. The processing circuits 410 may include logic circuits, controller circuits, and internal memory. The memory 420 may include a nonvolatile memory chip and external memory, such as a memory card. The networking device 460 may be a wireless or wired network interface device, such as a general packet radio service (GPRS) modem, and may establish a first network connection with a first server and a second network connection with a second server. The satellite navigation receiver 430 may receive satellite navigation signals, such as Global Positioning System signals, and may determine position of the personal navigation device 40 based on the satellite navigation signals. The components may be connected through a data bus 470 for transmitting and receiving commands and data between the various components.

In applying the method to the personal navigation device 40, a search term may be inputted in a user interface displayed by the processing circuits 410 in the display 400. The search term may be inputted through a soft keyboard displayed in the display 400, or through a regular keyboard interface with physical buttons. The search term may then be sent by the processing circuits 410 to a first server through the networking device 460. The networking device 460 may then receive matching category data from the first server, and the matching category data may be parsed by the processing circuits 410 to extract a representation of the matching category from the matching category data. The representation may then be displayed by the processing circuits 410 in the display 400. Based on the matching category, a query may be generated by the processing circuits 410 and sent to a second server through the networking device 460 to find point of interest items on the second server belonging to the matching category. Point of interest item data may be received by the networking device 460, and sent to the processing circuits 410. The processing circuits 410 may parse the point of interest item data to extract points of interest, which may be displayed by the processing circuits 410 in the display 400. If the networking device 460 receives no matching category data from the first server, the processing circuits 410 may generate a second query based on the search term, and send the second query to the second server through the networking device 460. The networking device 460 may receive point of interest data from the second server corresponding to matching point of interest items found by the second server that match the search term. The point of interest data may be sent to the processing circuits 410, which may parse the point of interest data to extract the matching point of interest items, and display the matching point of interest items in the display 400. When querying the first server, the processing circuits 410 may include the position of the personal navigation device 40 for receiving matching category data corresponding to categories having points of interest located within a predetermined distance of the position of the personal navigation device 40. When querying the second server, the processing circuits 410 may include the position of the personal navigation device 40 for receiving matching point of interest data corresponding to points of interest located within the predetermined distance of the position of the personal navigation device 40.

Compared to the prior art, the method described allows the user to perform a category search on the plurality of categories first, and then perform a database search on the POI repository server. The database search can be a limited search based on selection of a category found in the category search, or a general search of all POI items on the POI repository server. In this way, the method provides a more intuitive process for searching both categories and items, and also conserves resources when the database search is limited to the category found in the category search. The method allows the user to find more POI category and POI item information more quickly, allowing the user to find the POI items without having to browse through an entire directory tree in the PND.

Those skilled in the art will readily observe that numerous modifications and alterations of the device and method may be made while retaining the teachings of the invention.

What is claimed is:

1. A method of querying and displaying point of interest information in a personal navigation device, the method comprising:
   the personal navigation device sending a search term to a first server for finding a matching category corresponding to the search term, wherein the search term is inputted to the personal navigation device through a user interface of the personal navigation device;
   the personal navigation device receiving matching category data corresponding to the search term from the first server;
   the personal navigation device displaying a representation of the matching category described in the matching category data, wherein the representation of the matching category comprises a full path showing names of the matching category and ancestor categories of the matching category;
   the personal navigation device sending a query to a second server when the matching category is selected through the user interface of the personal navigation device;
   the personal navigation device receiving point of interest data corresponding to the matching category from the second server; and
   the personal navigation device displaying a point of interest described in the point of interest data.

2. The method of claim 1, wherein the representation of the matching category comprises a path of the matching category.

3. The method of claim 1, wherein the representation of the matching category comprises an abbreviated path of the matching category.

4. The method of claim 1, further comprising:
   displaying a representation of a descendant category of the matching category when the matching category data is received from the first server.

5. The method of claim 1, wherein displaying the representation of the matching category described in the matching category data comprises displaying a path of the matching category and number of descendent categories of the matching category.

6. A method of querying and displaying point of interest information in a personal navigation device, the method comprising:
   the personal navigation device sending a search term to a first server for finding a matching category corresponding to the search term, wherein the search term is inputted to the personal navigation device through a user interface of the personal navigation device;
   the personal navigation device sending the search term to a second server when no matching category is found when querying a plurality of categories on the first server;
   the personal navigation device receiving matching point of interest data from the second server; and
   the personal navigation device displaying a matching point of interest described in the matching point of interest data.

7. The method of claim 6, wherein displaying the matching point of interest comprises displaying a path of the matching point of interest.

8. The method of claim 6, wherein displaying the matching point of interest comprises displaying a full path showing names of the matching point of interest and ancestor categories of the matching point of interest.

9. The method of claim 6, wherein displaying the matching point of interest comprises displaying an abbreviated path of the matching point of interest.

10. The method of claim 6, wherein displaying the matching point of interest comprises displaying the matching point of interest on a map.

11. A personal navigation device comprising:
    a display;
    an input interface for receiving user input including a search term;
    a networking device for establishing a first network connection with a first server and a second network connection with a second server;
    processing circuits for controlling the networking device to send the search term to the first server, controlling the networking device to send the search term to a second server when no matching category is received from the first server, and controlling the display to display a matching point of interest described in matching point of interest data corresponding to the search term received from the second server through the networking device; and
    a data bus electrically connected to the display, the input interface, the networking device, and the processing circuits.

12. The personal navigation device of claim 11, wherein the input interface is a touch-sensitive layer applied to the display.

13. The personal navigation device of claim 11, further comprising:
    a satellite navigation receiver for determining position of the personal navigation device based on received satellite navigation signals;
    wherein when the processing circuits control the networking device to send the search term to the first server, the position is sent with the search term to the first server.

14. The personal navigation device of claim 13, wherein when the processing circuits control the networking device to send the query to the second server, the position is sent with the search term to the second server, and the matching point of interest data comprises matching points of interest located within a predetermined distance of the position of the personal navigation device.

* * * * *